(12) United States Patent
Kim et al.

(10) Patent No.: US 11,867,378 B2
(45) Date of Patent: Jan. 9, 2024

(54) LAMP FOR AUTOMOBILE AND AUTOMOBILE INCLUDING THE SAME

(71) Applicant: Hyundai Mobis Co., Ltd., Seoul (KR)

(72) Inventors: Myeong Je Kim, Yongin-si (KR); Jung Sub Lim, Yongin-si (KR); Han Seong Yu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 292 days.

(21) Appl. No.: 17/320,041

(22) Filed: May 13, 2021

(65) Prior Publication Data

US 2021/0372588 A1 Dec. 2, 2021

(30) Foreign Application Priority Data

May 27, 2020 (KR) .......................... 10-2020-0063813

(51) Int. Cl.

| | |
|---|---|
| *F21S 41/20* | (2018.01) |
| *G01S 13/86* | (2006.01) |
| *G01S 13/931* | (2020.01) |
| *G01S 17/86* | (2020.01) |
| *G01S 17/931* | (2020.01) |
| *F21S 45/00* | (2018.01) |
| *G01S 13/00* | (2006.01) |

(52) U.S. Cl.
CPC ............ *F21S 45/00* (2018.01); *F21S 41/285* (2018.01); *G01S 13/867* (2013.01); *G01S 13/931* (2013.01); *G01S 17/86* (2020.01); *G01S 17/931* (2020.01)

(58) Field of Classification Search
None
See application file for complete search history.

(56) References Cited

U.S. PATENT DOCUMENTS

| | | | |
|---|---|---|---|
| 2011/0193960 A1* | 8/2011 | Endo .................... | B60Q 1/0023 348/148 |
| 2012/0069319 A1 | 3/2012 | Maeno | |
| 2018/0045826 A1* | 2/2018 | Kasaba ................. | B60Q 1/0023 |
| 2018/0229645 A1* | 8/2018 | Hara ..................... | B60Q 1/0023 |
| 2018/0231206 A1 | 8/2018 | Hara | |
| 2019/0275923 A1 | 9/2019 | Fushimi | |
| 2020/0011989 A1 | 1/2020 | Takahashi | |

FOREIGN PATENT DOCUMENTS

| | | |
|---|---|---|
| FR | 3 090 822 | 6/2020 |
| JP | 2008-105518 | 5/2008 |
| WO | WO 2019/212032 | 11/2019 |

OTHER PUBLICATIONS

Extended European Search Report dated Sep. 22, 2021 issued in EP 21174747.2.
European Office Action dated Jul. 11, 2023 issued in EP 21174747.2.

\* cited by examiner

*Primary Examiner* — Bernarr E Gregory
(74) *Attorney, Agent, or Firm* — DLA PIPER LLP (US)

(57) ABSTRACT

A lamp for an automobile and an automobile including the lamp. According to one aspect, the lamp is for an automobile and includes a light source and an anti-reflection coating layer attached to a portion of a surface of a lens. The anti-reflection coating layer preventing deterioration in quality of the image captured by the camera due to the light emitted from the light source in the lamp.

14 Claims, 4 Drawing Sheets

LAMP FOR AUTOMOBILE AND AUTOMOBILE INCLUDING THE SAME

CROSS-REFERENCE TO RELATED APPLICATION(S)

This application claims priority from and the benefit of Korean Patent Application No. 10-2020-0063813, filed on May 27, 2020, which is hereby incorporated by reference for all purposes as if set forth herein.

TECHNICAL FIELD

Exemplary embodiments relate to a lamp for an automobile and an automobile including the same and, more particularly, to a lamp for an automobile including a camera and an automobile including the same.

BACKGROUND

Recently, in order to assist or replace driving of a driver, research on devices mounted to an automobile has been actively performed. As one example of the devices, a lamp for an automobile is equipped with not only a light source and a lens but also a camera for capturing a region in front or rear of the automobile.

However, according to the related art, when the camera is mounted to the lamp for an automobile as described above, a portion of light coming from the light source mounted to the lamp for an automobile enters the camera, which causes significant deterioration in quality of an image captured by the camera. For example, when the camera is mounted to the lamp for an automobile, a portion of the light emitted from the light source mounted to the lamp for an automobile is reflected from the lens of the lamp for an automobile and then enters the camera. Accordingly, the image captured by the camera is distorted due to the entering light.

SUMMARY

Exemplary embodiments of the present disclosure is to prevent deterioration in quality of an image captured by a camera due to light emitted from a light source in a lamp for an automobile to which the camera is mounted.

A first exemplary embodiment of the present disclosure provides a lamp for an automobile, the lamp including: a light source configured to emit light forward; a camera provided on one side of the light source and configured to capture an external image; a lens provided in front of the light source and the camera; and an anti-reflection coating layer attached to a portion of a surface of the lens, wherein the anti-reflection coating layer is attached to at least a partial area of the lens which faces the camera.

The anti-reflection coating layer may be attached to at least a partial area of the lens which is positioned in a space within a view angle of the camera.

The anti-reflection coating layer may be attached to the entire area of the lens which is positioned in a space within a view angle of the camera.

The lamp may further include a first sensor provided on one side of the light source and the camera and configured to emit an electromagnetic wave forward and sense a region in front of the first sensor, wherein the anti-reflection coating layer is not attached to at least a partial area of the lens which faces the first sensor.

The anti-reflection coating layer may not be attached to at least a partial area of the lens which is positioned within a space detectable by the first sensor.

The anti-reflection coating layer may not be attached to the entire area of the lens which is positioned within a space detectable by the first sensor.

The electromagnetic wave emitted from the first sensor may be a microwave.

The first sensor may be radio detection and ranging (RADAR).

The camera may be provided facing one end area of the lens in a left-right direction, and the first sensor may be provided facing an end area of the lens on the opposite side from the one end area of the lens in the left-right direction.

The lamp may further include a second sensor provided between the camera and the first sensor, wherein the anti-reflection coating layer is attached to at least a partial area of the lens which faces the second sensor.

The anti-reflection coating layer may be attached to at least a partial area of the lens which is positioned within a space detectable by the second sensor.

The anti-reflection coating layer may be attached to the entire area of the lens which is positioned within a space detectable by the second sensor.

The second sensor may be light detection and ranging (LIDAR).

A second exemplary embodiment of the present disclosure provides an automobile including a lamp for an automobile, wherein the lamp includes: a light source configured to emit light forward; a camera provided on one side of the light source and configured to capture an external image; a lens provided in front of the light source and the camera; and an anti-reflection coating layer attached to a portion of a surface of the lens, wherein the anti-reflection coating layer is attached to at least a partial area of the lens which faces the camera.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a lamp for an automobile, and an automobile according to the present disclosure will be described with reference to the drawings.

Lamp for Automobile

Figure 1:
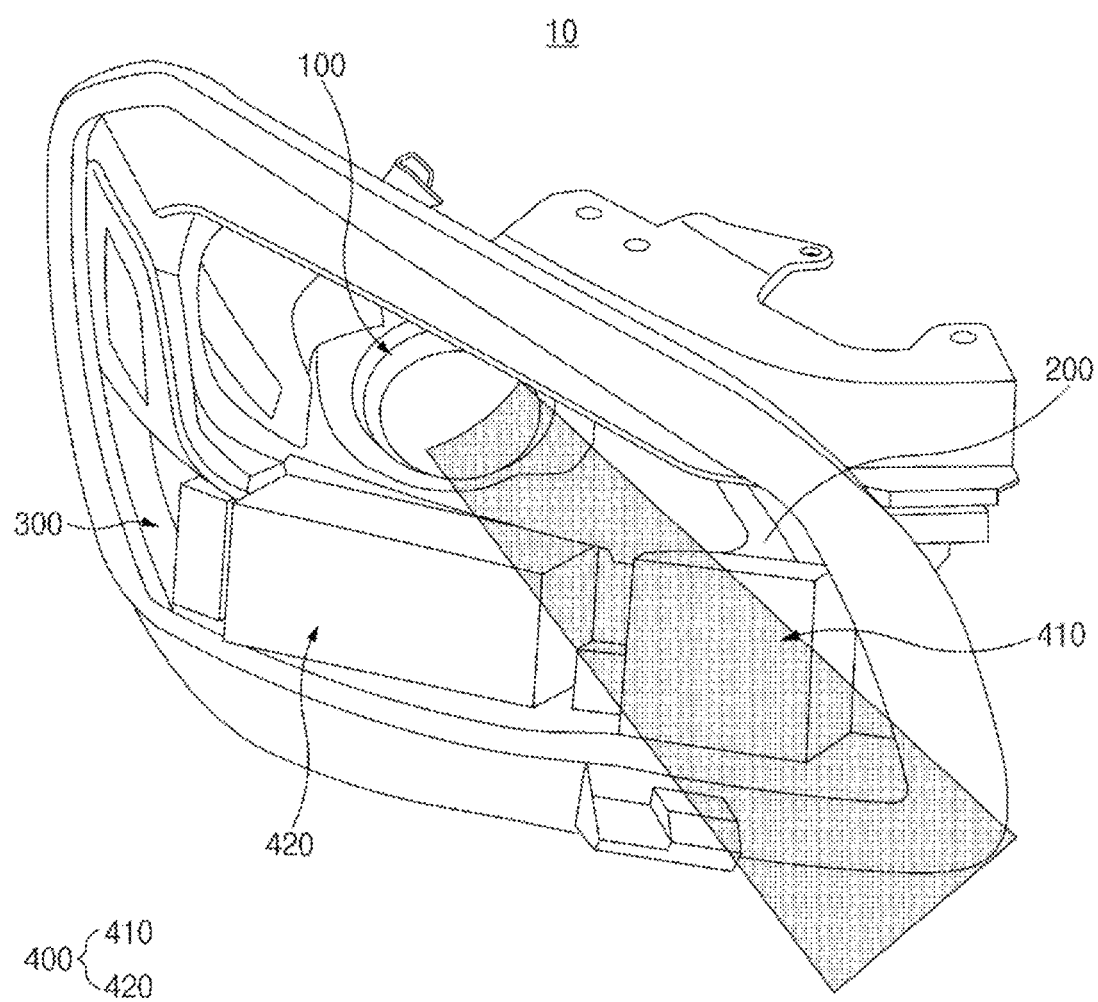
FIG. 1 is a perspective view illustrating a lamp for an automobile according to the present disclosure.
Figure 2:
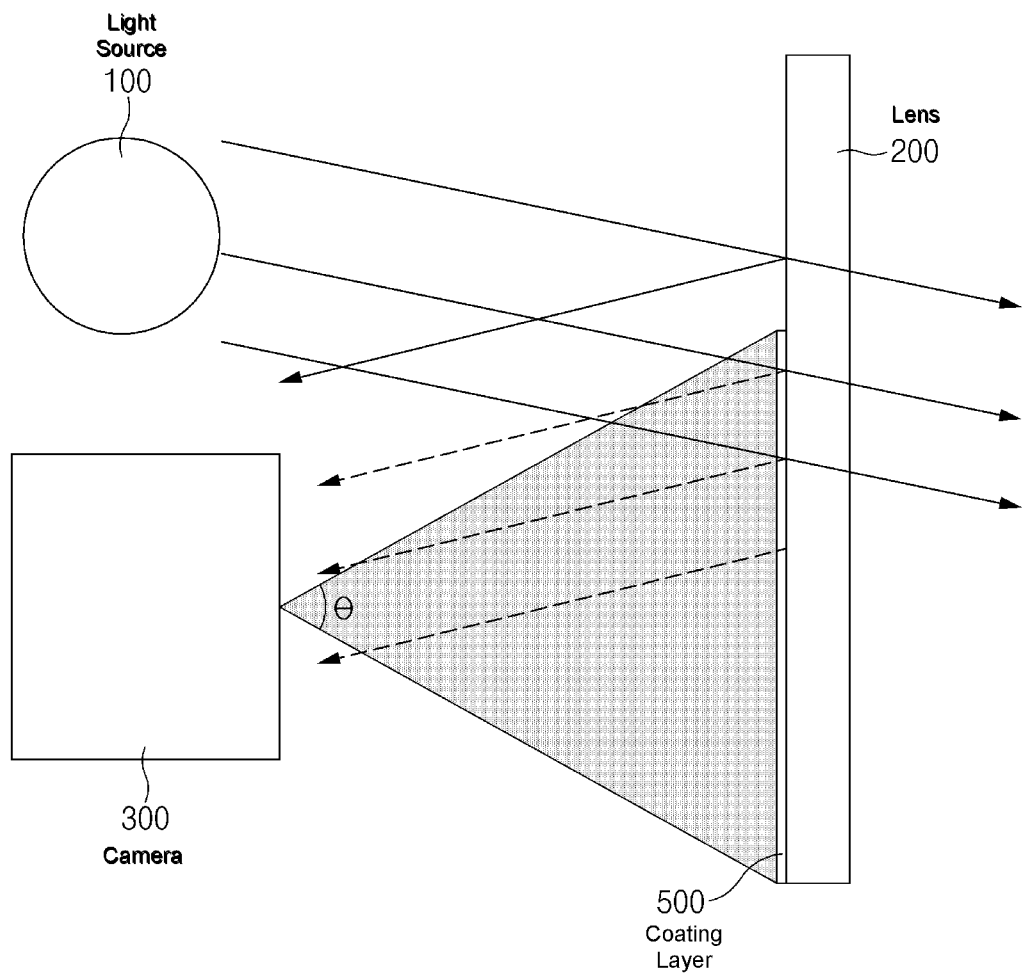
FIG. 2 is a side view schematically illustrating relationship between a light source, a lens, a camera, and an anti-reflection coating layer in a lamp for an automobile according to the present disclosure.
Figure 3:
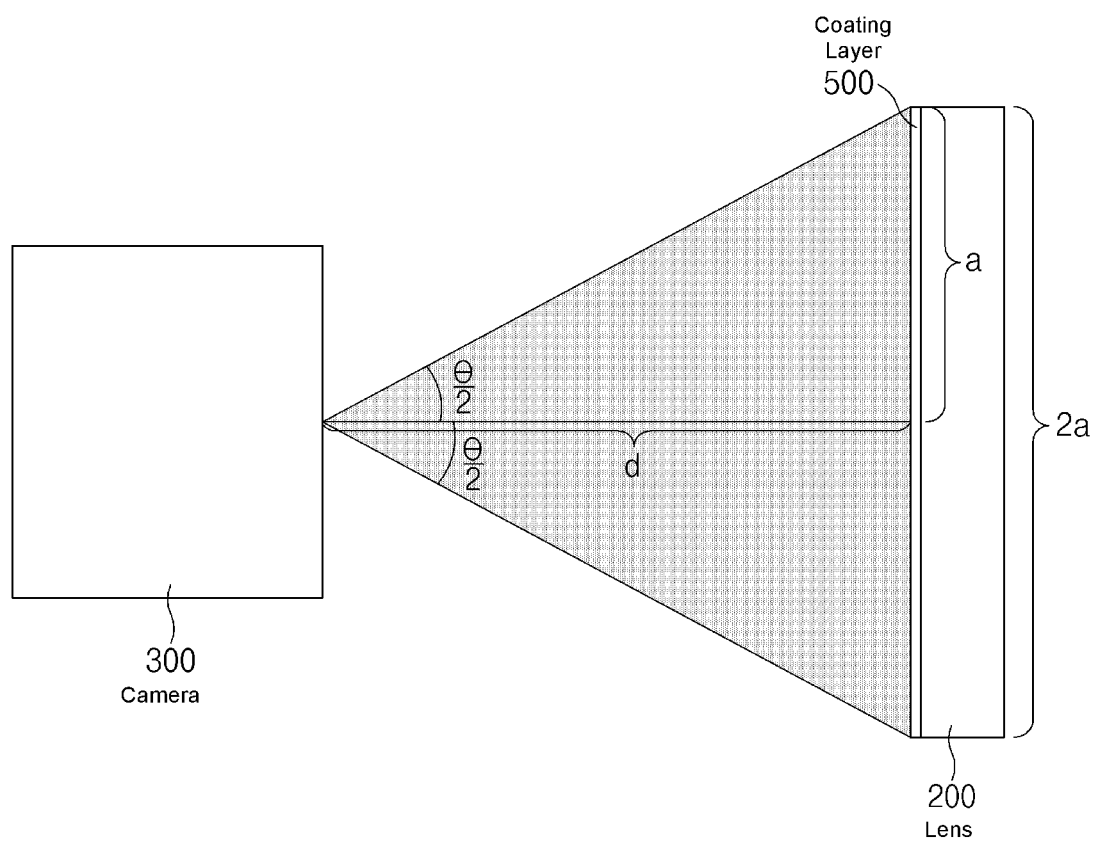
FIG. 3 is a side view schematically illustrating relationship between a camera, a lens, and an anti-reflection coating layer in a lamp for an automobile according to the present disclosure.
Figure 4:
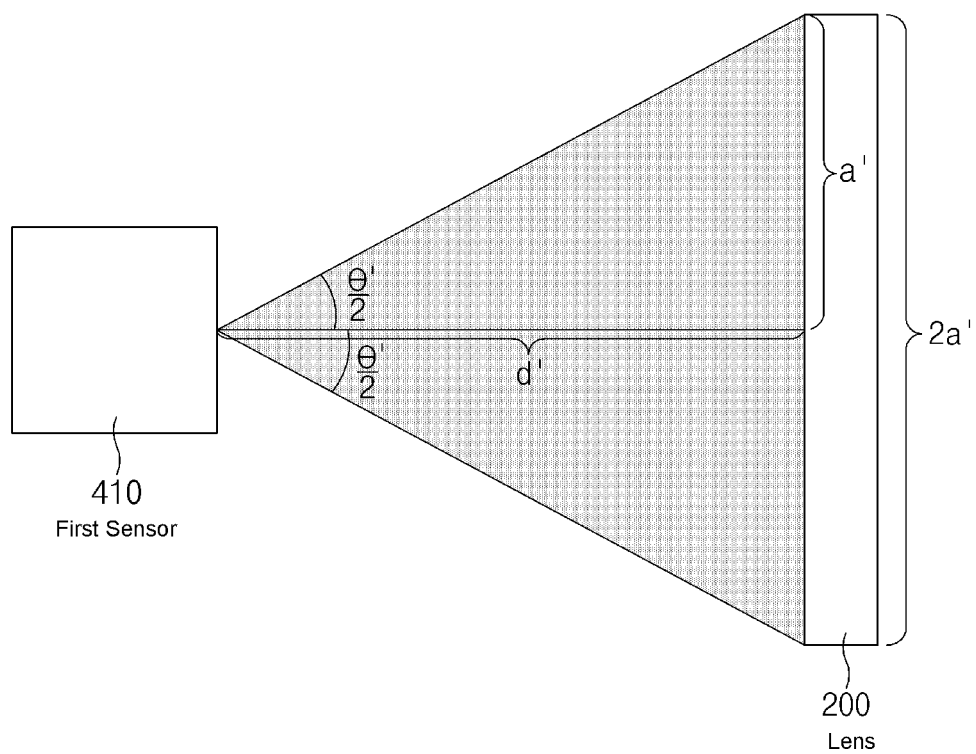
FIG. 4 is a side view schematically illustrating relationship between a first sensor and a lens in a lamp for an automobile according to the present disclosure.

FIG. 1 is a perspective view illustrating a lamp for an automobile according to the present disclosure, and FIG. 2 is a side view schematically illustrating relationship between a light source, a lens, a camera, and an anti-reflection coating layer in a lamp for an automobile according to the present disclosure. Also, FIG. 3 is a side view schematically illustrating relationship between a camera, a lens, and an anti-reflection coating layer in a lamp for an automobile according to the present disclosure, and FIG. 4 is a side view schematically illustrating relationship between a first sensor and a lens in a lamp for an automobile according to the present disclosure.

Referring to FIGS. 1 and 2, a lamp 10 for an automobile (hereinafter, referred to as a 'lamp') according to the present disclosure may include a light source 100 that emits light forward. As illustrated in FIGS. 1 and 2, the light source 100 may be a component that forms a beam pattern to the outside by emitting light forward.

Also, the lamp 10 may further include a lens 200 provided in front of the light source 100 and a camera 300 provided on one side of the light source 100 to capture an external image. FIG. 1 illustrates a state in which the camera 300 is provided below the light source 100.

The lens 200 may be a component which protects, from the outside, components provided inside the lamp 10, such as the light source 100 and the camera 300 which constitute the lamp 10. Also, the lens 200 may be a component which forms a light emitting surface of the lamp 10 due to light emitted from the light source 100. For example, the lens 200 may be an outer lens provided at the outermost portion of the lamp 10. However, unlike the above, the lens 200 may be an inner lens provided in an inner space of the lamp 10.

Referring to FIG. 1 again, the lamp 10 may further include a sensor 400 provided on one side of the light source 100 and the camera 300. Here, according to the present disclosure, the sensor 400 may include a plurality of sensors which are operated by different operation principles.

For example, the sensor 400 may include a first sensor 410 and a second sensor 420 which are provided on one side of the light source 100 and the camera 300 and emit electromagnetic waves forward to sense regions in front of the sensor 400. Also, in the specification, the electromagnetic wave may be interpreted as representing a wave which is formed by a magnetic field and an electric field oscillating mutually in vertical directions irrespective of a wavelength or a frequency.

Also, the camera 300 may be provided facing one end area of the lens 200 in a left-right direction. FIG. 1 illustrates a state in which the camera 300 is provided facing the left end area of the lens 200. Here, the first sensor 410 may be provided facing an end area of the lens 200 on the opposite side from the one end area of the lens 200 facing the camera 300 among end areas of the lens 200 in the left-right direction. FIG. 1 illustrates a state in which the first sensor 410 is provided facing the right end area of the lens 200.

Also, the second sensor 420 may be provided between the camera 300 and the first sensor 410. That is, according to the present disclosure, the camera 300 may be provided closer to the second sensor 420 than the first sensor 410.

Also, referring to FIGS. 2 and 3, the lamp 10 according to the present disclosure may further include an anti-reflection coating layer 500 attached to a portion of a surface of the lens 200.

A portion of light emitted from the light source 100 is reflected from the lens 200 and then arrives at a component provided inside the lamp 10, resulting in the malfunction of the component. The anti-reflection coating layer 500 may be a component for preventing the malfunction described above. In particular, the light emitted from the light source 100 is reflected from the lens 200 and then enters the camera 300, resulting in the distortion of an external image captured by the camera 300. The anti-reflection coating layer 500 of the lamp 10 according to the present disclosure may be a component for preventing the distortion described above. The principle of functions of the anti-reflection coating layer 500 is as follows.

Among the light emitted from the light source 100 of the lamp 10, light entering again to the inner space of the lamp 10 via the anti-reflection coating layer 500 may be mainly classified into: light (i) reflected from the surface of the anti-reflection coating layer 500 and then entering the inner space of the lamp 10; and light (ii) passing through the anti-reflection coating layer 500, reflected from the surface of the lens 200, passing through the anti-reflection coating layer 500 again, and then entering the inner space of the lamp 10.

Here, the light (ii) may move more than the light (i) by twice the thickness of the anti-reflection coating layer 500, and thus, the light (ii) on the surface of the anti-reflection coating layer 500 may further have an optical path equivalent to twice the thickness of the anti-reflection coating layer 500 multiplied by the refractive index of the anti-reflection coating layer 500 than the light (i). Thus, due to the optical path, a phase difference may occur between a wave of the light (i) and a wave of the light (ii) on the surface of the anti-reflection coating layer 500.

Here, when the phase of the wave of the light (i) and the phase of the wave of the light (ii) are opposite to each other on the surface of the anti-reflection coating layer 500, destructive interference occurs between the light (i) and the light (ii). Through this, it is possible to prevent an external image captured by the camera 300 from being distorted due to the light arriving from the light source 100. In FIG. 2, the light, in which the destructive interference described above has occurred due to the anti-reflection coating layer 500, is illustrated by dotted-line arrows.

As described above, the anti-reflection coating layer 500 according to the present disclosure may be to prevent the light emitted from the light source 100 from entering the camera 300 after being reflected from the lens 200. Also, the light, which is emitted from the light source 100 and arrives the camera 300 after being reflected from the lens 200, is mainly present in an area of the lens 200, facing the camera 300, in front of the camera 300. Thus, according to the present disclosure, the anti-reflection coating layer 500 may be attached to at least a partial area of the lens 200 facing the camera 300. For example, the anti-reflection coating layer 500 may be attached to the entire area of the lens 200 facing the camera 300.

Also, referring to FIG. 3, the camera 300 may have a view angle in which an external image may be captured through the camera 300. FIG. 3 illustrates a case in which the camera 300 provided in the lamp 10 according to the present disclosure has an angle of θ/2 in each of upward and downward directions and thus has the total view angle of θ in the upward and downward directions. In this case, the camera 300 may capture images which are present in a space within the view angle.

Here, according to the present disclosure, the anti-reflection coating layer 500 may be attached to at least a partial area of the lens 200 which is positioned in the space within the view angle of the camera 300. More preferably, the anti-reflection coating layer 500 may be attached to the entire area of the lens 200 which is positioned in the space within the view angle of the camera 300. Here, the anti-reflection coating layer 500 may be attached only to the entire area of the lens 200 which is positioned in the space within the view angle of the camera 300, but may be attached to another area, which will be described later.

Also, the first sensor 410 and the second sensor 420 in the lamp 10 according to the present disclosure may be components having different types of operation principles. In particular, types of electromagnetic waves emitted from the first sensor 410 and the second sensor 420 may be different from each other. For example, the electromagnetic wave emitted from the first sensor 410 may be a microwave, and the electromagnetic wave emitted from the second sensor 420 may be an infrared ray or a visible ray. For example, a wavelength of the electromagnetic wave emitted from the second sensor 420 may be about 600 nm to about 1000 nm. More preferably, the first sensor 410 may be radio detection and ranging (RADAR), and the second sensor 420 may be light detection and ranging (LIDAR).

Here, referring to FIG. 4, the anti-reflection coating layer 500 according to the present disclosure may not be attached to at least a partial area of the lens 200 which faces the first sensor 410. For example, the anti-reflection coating layer 500 may not be attached to at least a partial area of the lens 200 which is positioned within a space detectable by the first sensor 410. More preferably, the anti-reflection coating layer 500 may not be attached to the entire area of the lens 200 which is positioned within a space detectable by the first sensor 410. FIG. 4 illustrates a case in which each of an upward angle and a downward angle in a space detectable by the first sensor 410 is formed to be θ'/2. Thus, the total detectable angle in the upward and downward directions is formed to be θ.

As described above, the electromagnetic wave emitted from the first sensor 410 may be a microwave, and the first sensor 410 may be RADAR. On the other hand, the light emitted from the light source 100 may be a visible ray. Thus, there is a significant difference in scale between the wavelengths emitted from the light source 100 and the first sensor 410. That is, the microwave has a wavelength ranging from about 1 mm to about 30 cm while the visible ray has a wavelength ranging from about 380 nm to about 780 nm. Thus, the microwave has a wavelength 1000 times or more greater than the visible ray.

Also, as described above, the anti-reflection coating layer 500 is a component for preventing the light emitted from the light source 100, that is, the visible ray from entering the camera 300 after being reflected from the lens 200. Thus, when the anti-reflection coating layer 500 is attached to an area adjacent to the first sensor 410 that emits the microwave having a wavelength significantly greater than that of the visible ray, destructive interference does not occur between a microwave (hereinafter, referred to as a 'first microwave') emitted from the first sensor 410 and reflected from the surface of the anti-reflection coating layer 500 and a microwave (hereinafter, referred to as a 'second microwave') emitted from the first sensor 410, passing through the anti-reflection coating layer 500, reflected from the surface of the lens 200, and then arriving at the surface of the anti-reflection coating layer 500 again. Rather, constructive interference occurs therebetween, and a superposed wave between the microwaves, in which the constructive interference has occurred, arrives the first sensor 410. That is, since the microwave has the wavelength significantly greater than that of the visible ray, the first microwave and the second microwave have little difference in phases according to an optical path due to the thickness of the anti-reflection coating layer 500. Thus, the constructive interference still occurs between the first microwave and the second microwave. In this case, frontal sensing capabilities of the first sensor 410 may be deteriorated due to noise generated from the constructive interference between the first microwave and the second microwave. However, as described above, when the anti-reflection coating layer 500 is not attached to at least a partial area of the lens 200 which is positioned within a space detectable by the first sensor 410, it is possible to prevent the frontal sensing capabilities of the first sensor 410 from being deteriorated.

On the other hand, the anti-reflection coating layer 500 may be attached to at least a partial area of the lens 200 which faces the second sensor 420. For example, the anti-reflection coating layer 500 may be attached to at least a partial area of the lens 200 which is positioned within a space detectable by the second sensor 420. Alternatively, the anti-reflection coating layer 500 may be attached to the entire area of the lens 200 which is positioned within a space detectable by the second sensor 420.

The electromagnetic wave emitted from the second sensor 420 may be an infrared ray or a visible ray. That is, when compared to the first sensor 410, the wavelength of the electromagnetic wave emitted from the second sensor 420 has a similar scale to the wavelength of the visible ray emitted from the light source 100. Thus, unlike the first sensor 410, even when the anti-reflection coating layer 500 is attached to an area adjacent to the second sensor 420, destructive interference may occur between an electromagnetic wave emitted from the second sensor 420 and reflected from the surface of the anti-reflection coating layer 500 and an electromagnetic wave emitted from the second sensor 420, passing through the anti-reflection coating layer 500, reflected from the surface of the lens 200, and arriving at the surface of the anti-reflection coating layer 500 again. Thus, the frontal sensing capabilities of the second sensor 420 may be still maintained. However, according to another example of the present disclosure, as in the first sensor 410, the anti-reflection coating layer 500 may not be attached to at least the partial area facing the second sensor 420.

Also, according to the present disclosure, a refractive index of the lens 200 may be greater than a refractive index of the anti-reflection coating layer 500. However, unlike the above, the refractive index of the lens 200 may be less than the refractive index of the anti-reflection coating layer 500.

Automobile

An automobile according to the present disclosure may include a lamp 10 for an automobile (hereinafter referred to as a 'lamp'). Here, the lamp 10 may be a lamp which is provided in the front of the automobile.

Here, the lamp 10 may include a light source 100 for emitting light forward, a camera 300 provided on one side of the light source 100 and capturing an external image, a lens 200 provided in front of the light source 100 and the camera 300, and an anti-reflection coating layer 500 attached to a portion of a surface of the lens 200. Here, according to the present disclosure, the anti-reflection coating layer 500 may be attached to at least a partial area of the lens 200 facing the camera 300.

According to the present disclosure, it is possible to prevent the deterioration in quality of the image captured by the camera due to the light emitted from the light source in the lamp for an automobile to which the camera is mounted.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A lamp for an automobile, the lamp comprising:
a light source configured to emit light forward;
a camera provided on one side of the light source and configured to capture an external image;
a lens provided in front of the light source and the camera; and
an anti-reflection coating layer attached to a portion of a surface of the lens,
wherein the anti-reflection coating layer is attached to at least a partial area of the lens that faces the camera, the anti-reflection coating layer having a thickness and refractive index for causing destructive interference between a first wave of light emitted from the light source and reflected by the anti-reflection coating layer and a second wave of light emitted from the light source passing through the anti-reflection coating layer and reflected by the lens.

2. The lamp of claim 1, wherein the anti-reflection coating layer is further attached to at least a partial area of the lens that is positioned in a space within a view angle of the camera.

3. The lamp of claim 1, wherein the anti-reflection coating layer is further attached to an entire area of the lens that is positioned in a space within a view angle of the camera.

4. The lamp of claim 1, further comprising a first sensor provided on one side of the light source and the camera and configured to emit an electromagnetic wave forward and sense a region a field of view of the first sensor,
wherein the anti-reflection coating layer is not attached to present in at least a partial area of the lens that faces the first sensor.

5. The lamp of claim 4, wherein the anti-reflection coating layer is not attached to at least a partial area of the lens that is positioned within a view angle detectable by the first sensor.

6. The lamp of claim 4, wherein the anti-reflection coating layer is not present in an entire area of the lens that is positioned within a view angle detectable by the first sensor.

7. The lamp of claim 4, wherein the electromagnetic wave emitted from the first sensor is a microwave.

8. The lamp of claim 4, wherein the first sensor is radio detection and ranging (RADAR).

9. The lamp of claim 4, wherein the camera is provided facing one end area of the lens in a left-right direction, and
the first sensor is provided facing an end area of the lens on an opposite side from the one end area of the lens in the left-right direction.

10. The lamp of claim 4, further comprising a second sensor provided between the camera and the first sensor,
wherein the anti-reflection coating layer is attached to at least a partial area of the lens that faces the second sensor.

11. The lamp of claim 10, wherein the anti-reflection coating layer is attached to at least a partial area of the lens that is positioned within a view angle detectable by the second sensor.

12. The lamp of claim 10, wherein the anti-reflection coating layer is attached to an entire area of the lens that is positioned within a space view angle detectable by the second sensor.

13. The lamp of claim 10, wherein the second sensor is light detection and ranging (LIDAR).

14. An automobile comprising a lamp, wherein the lamp comprises:
a light source configured to emit light forward;
a camera provided on one side of the light source and configured to capture an external image;
a lens provided in front of the light source and the camera; and
an anti-reflection coating layer attached to a portion of a surface of the lens, wherein the anti-reflection coating layer is attached to at least a partial area of the lens that faces the camera, the anti-reflection coating layer having a thickness and refractive index for causing destructive interference between a first wave of light emitted from the light source and reflected by the anti-reflection coating layer and a second wave of light emitted from the light source passing through the anti-reflection coating layer and reflected by the lens.

* * * * *